United States Patent [19]

Boelstler et al.

[11] Patent Number: 5,544,838
[45] Date of Patent: Aug. 13, 1996

[54] SEAT BELT RETRACTOR

[75] Inventors: Richard Boelstler, Warren; Chhay S. Siev, Shelby Township, both of Mich.

[73] Assignee: TRW Vehicle Safety Systems Inc., Lyndhurst, Ohio

[21] Appl. No.: 194,030

[22] Filed: Feb. 9, 1994

[51] Int. Cl.⁶ .................................................. B60R 22/38
[52] U.S. Cl. ............................................... 242/384.2
[58] Field of Search ............................. 242/383, 383.4, 242/384, 384.2, 384.6; 297/478, 480; 280/806

[56] References Cited

U.S. PATENT DOCUMENTS

| | | | |
|---|---|---|---|
| 3,836,171 | 9/1974 | Hayashi et al. | 242/384.2 |
| 3,858,824 | 1/1975 | Stephenson | 242/383.4 |
| 3,917,188 | 11/1975 | Nilsson | 242/384 |
| 3,926,384 | 12/1975 | Weman | 242/384.6 |
| 4,085,905 | 4/1978 | Lindbald . | |
| 4,151,967 | 5/1979 | Lindbald . | |
| 4,176,809 | 12/1979 | Thomas et al. | 242/384.6 |
| 4,331,304 | 5/1982 | Matsuoka et al. | 242/384.2 |
| 4,401,282 | 8/1983 | Miki | 242/384.2 |
| 4,475,697 | 10/1984 | Wyder | 242/384.2 |
| 4,619,418 | 10/1986 | Butenop . | |
| 4,619,419 | 10/1986 | Essler . | |
| 4,867,390 | 9/1989 | Joly | 222/384.6 |
| 4,979,695 | 12/1990 | Matsuki et al. | 242/384.6 |
| 5,014,926 | 5/1991 | Rumpf et al. . | |

FOREIGN PATENT DOCUMENTS 2084733  4/1982  United Kingdom ................ 242/384.6

Primary Examiner—John P. Darling
Attorney, Agent, or Firm—Tarolli, Sundheim, Covell, Tummino & Szabo

[57] ABSTRACT

A vehicle seat belt retractor (10) includes a frame (12) supporting a spool (50) on which seat belt webbing (72) is wound for rotation in belt withdrawal (76) and belt retraction (75) directions. A lever (196) for use in preventing rotation of the spool (50) in the belt withdrawal direction (76) has a cylindrical portion (220) and a key (224) extending radially outward from the cylindrical portion (220). The lever (196) is supported for pivotal movement on a support member (112) that has a cylindrical chamber (222) for receiving the cylindrical portion (220) of the lever (196). A keyway (226) extends radially outward from the cylindrical chamber (222) for receiving the key (224) of the lever (196). The keyway (226) includes a surface (227) engageable by the key (224) of the lever (196) to prevent axial movement of the cylindrical portion (220) out of the cylindrical chamber (222).

10 Claims, 5 Drawing Sheets

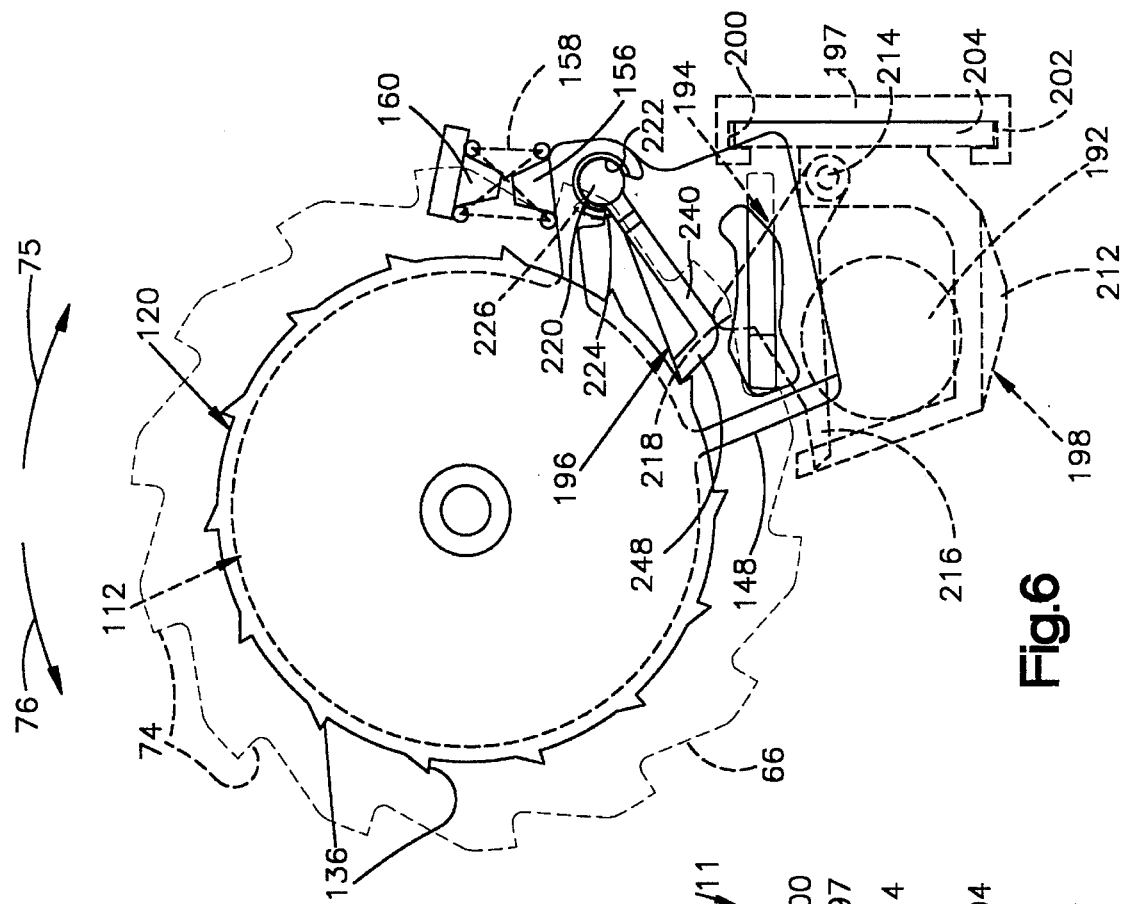
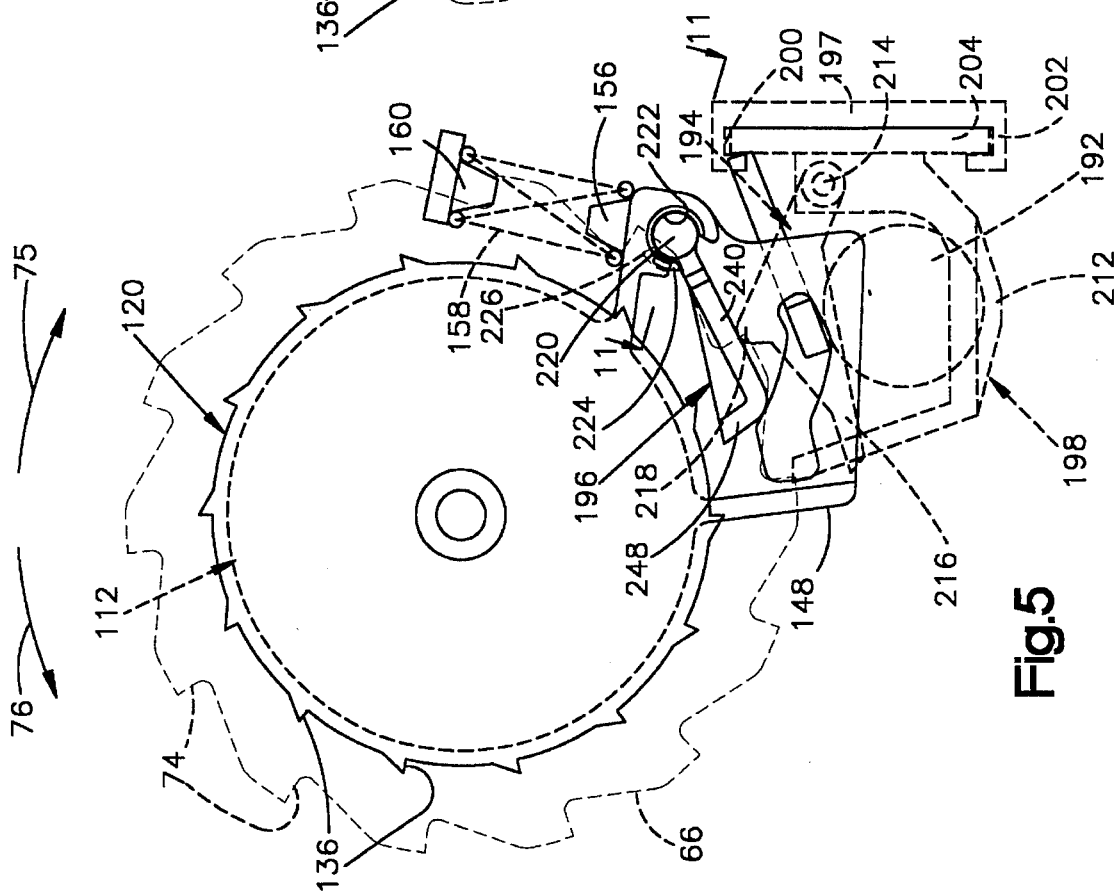

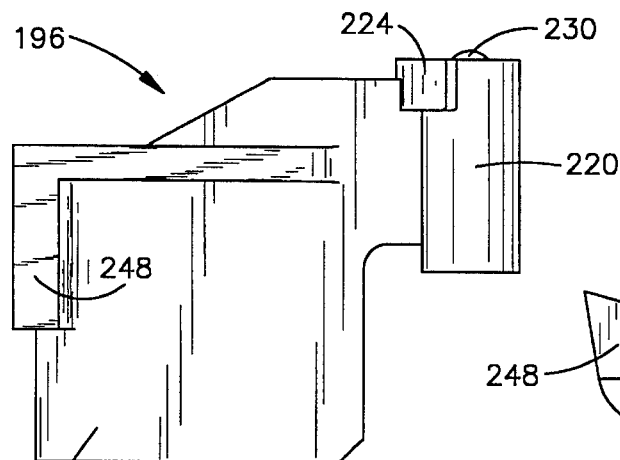
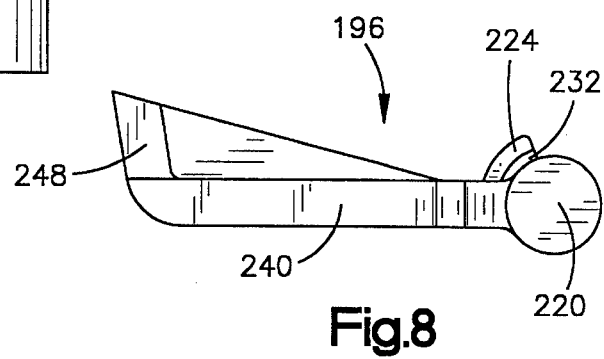
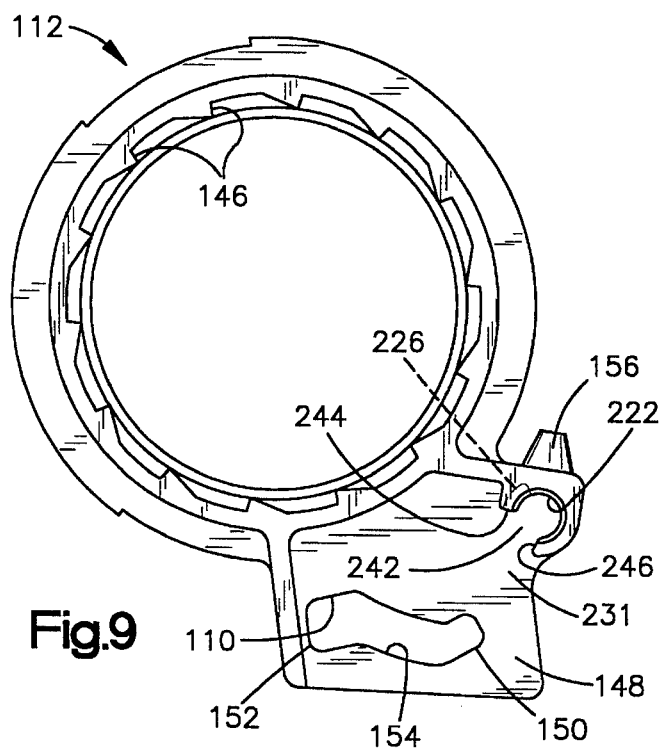
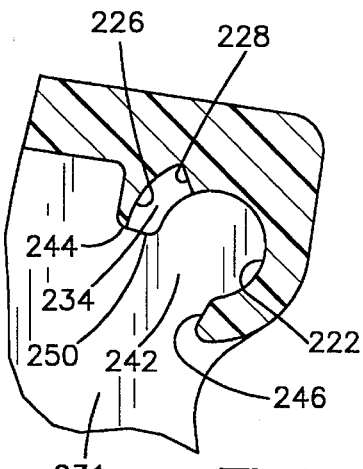
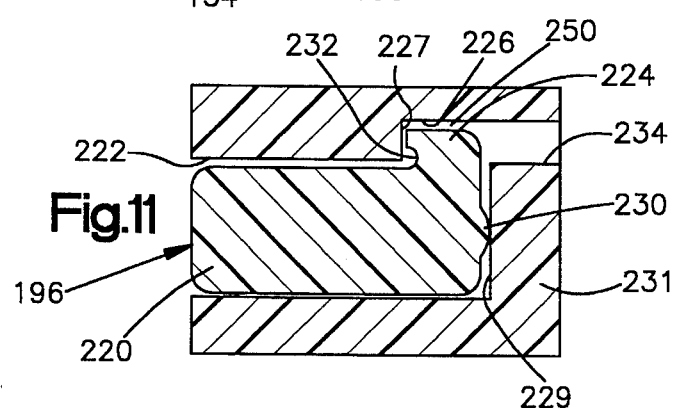

SEAT BELT RETRACTOR

BACKGROUND OF THE INVENTION

The present invention relates to a vehicle seat belt retractor having a spool on which seat belt webbing is wound, and in particular relates to a seat belt retractor having a lever for use in preventing rotation of the spool in a belt withdrawal direction.

A known seat belt retractor having a lever for use in preventing rotation of a spool in a belt withdrawal direction is disclosed in U.S. Pat. No. 5,014,926. U.S. Pat. No. 5,014,926 discloses a lever 196 which is used in preventing rotation of a seat belt retractor spool. It is desirable to provide a retractor construction in which the assembly of the lever is simple.

SUMMARY OF THE INVENTION

An improved vehicle seat belt retractor includes a lever for use in preventing rotation in a belt withdrawal direction of a spool on which seat belt webbing is wound. The lever has a cylindrical portion and a key extending radially outward from the cylindrical portion. A member for supporting the lever for pivotal movement includes a cylindrical chamber for receiving the cylindrical portion of the lever. A keyway extending radially outward from the cylindrical chamber receives the key of the lever. The keyway is defined by a surface engageable by the key to prevent axial movement of the cylindrical portion out of the cylindrical chamber.

BRIEF DESCRIPTION OF THE DRAWINGS

Further features of the present invention will become apparent to those skilled in the art to which the present invention relates from reading the following specification with reference to the accompanying drawings, in which:

FIGS. 4 through 6 are views similar to FIG. 3 with parts shown in different positions;

FIG. 7 is a plan view of an actuation lever which forms a/art of the retractor of FIG. 1;

FIG. 8 is a side elevational view of the lever of FIG. 7;

FIG. 9 is a view of a lock-bar actuator which forms a part of the retractor of FIG. 1;

FIG. 10 is an enlarged sectional view of a portion of the lock-bar actuator of FIG. 9; and FIG. 11 is a sectional view taken along the line 11—11 of FIG. 5.

DESCRIPTION OF A PREFERRED EMBODIMENT

Figure 1:
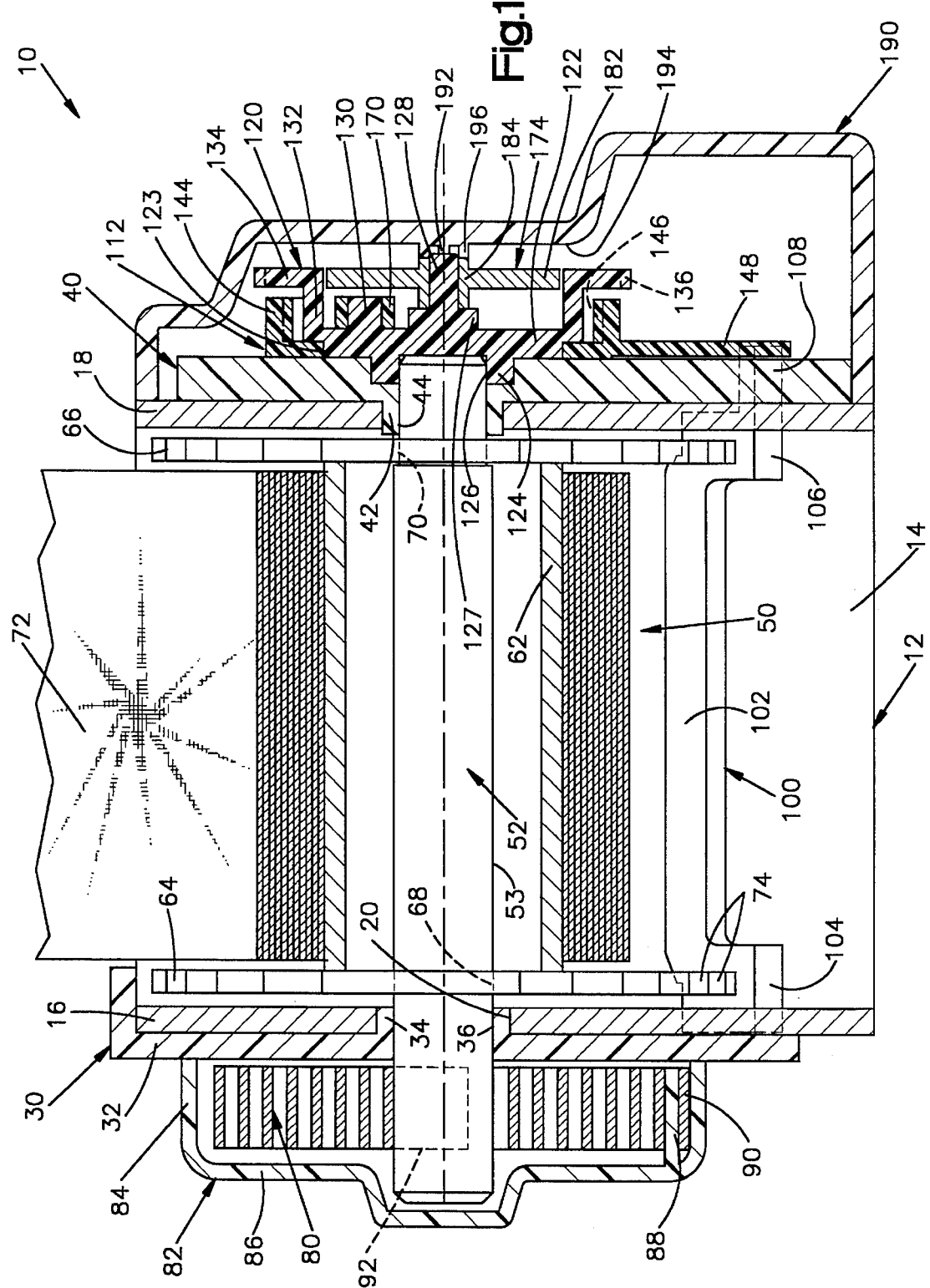
FIG. 1 is a longitudinal sectional view of a seat belt retractor embodying the present invention and with parts removed.
Figure 2:
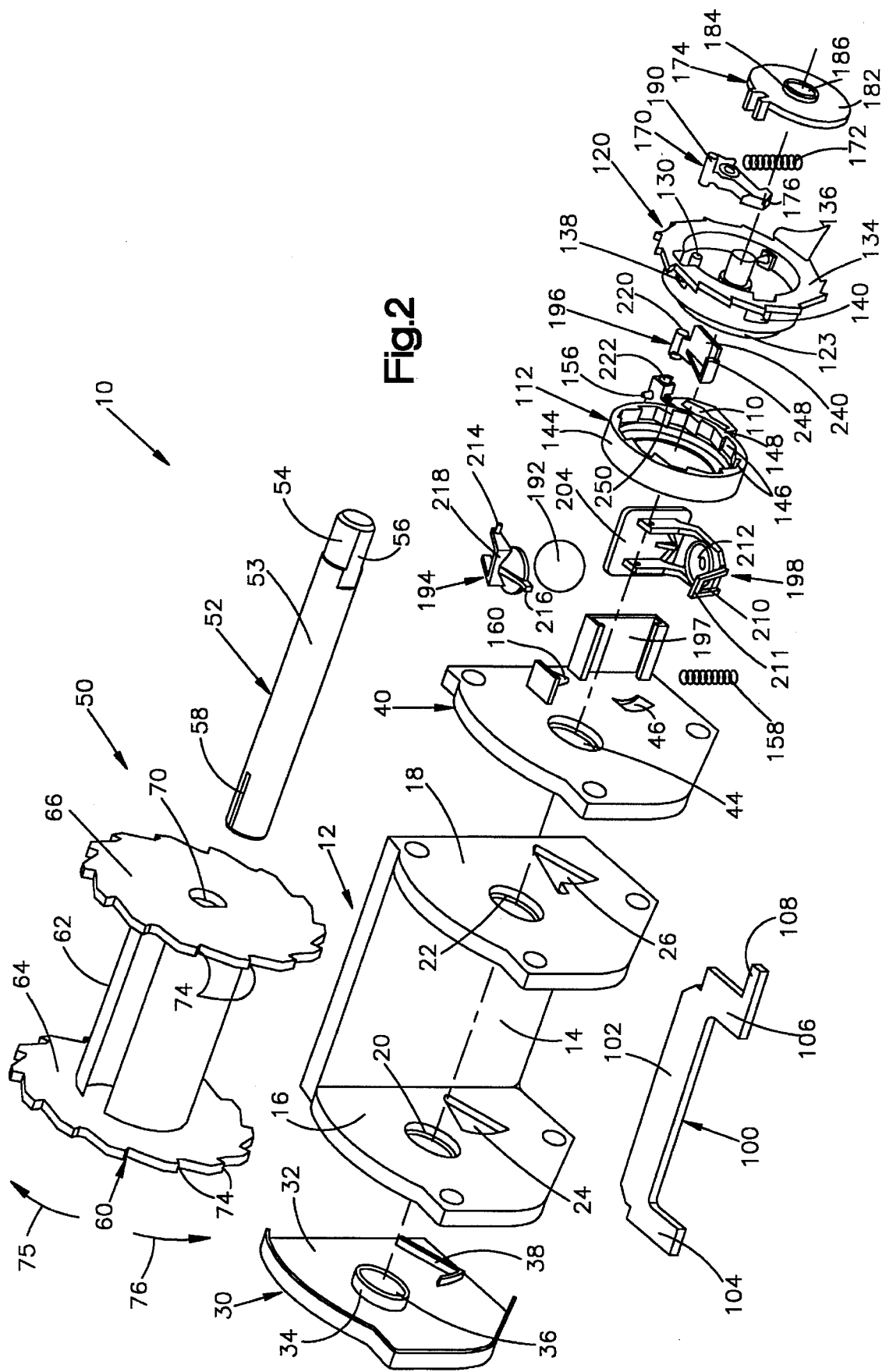
FIG. 2 is an exploded perspective view of certain parts of the retractor of FIG. 1.

A vehicle seat belt retractor 10 (FIGS. 1 and 2) includes a frame 12 fixedly connected to the vehicle. The frame 12 includes a base 14 and sides 16 and 18 extending perpendicular to the base 14. A circular opening 20 and a lock bar opening 24 extend through the frame side 16. A circular opening 22, coaxial with opening 20, and a lock bar opening 26, aligned with opening 24, extend through the frame side 18. The frame 12 is preferably made of metal.

A plastic plate 30 is fixed to the frame side 16. The plate 30 includes a wall Portion 32 with a projecting boss 34. An opening 36 extend through the wall portion 32 and boss 34. The wall portion 32 of the plate 30 abuts the frame side 16. The boss 34 fits within the opening 20 in the frame side 16. A projection 38 is attached to the wall portion 32 of the plate 30, and fits within the lock bar opening 24 in the frame side 16 adjacent the surface that defines the opening 24.

A plastic attachment plate 40 is fixed to the frame side 18. A circular boss 42 projects from the attachment plate 40. A circular opening 44 extends through the attachment plate 40 and the boss 42. The boss 42 fits within the opening 22 in the frame side 18. A lock bar opening 46 in the attachment plate 40 is aligned with a portion of the lock bar opening 26 in the frame side 18.

A spool 50 includes a shaft 52 having a full diameter portion 53 and a reduced diameter portion 54 at one end. A flat 56 on the shaft 52 extends axially for the length of the reduced diameter shaft portion 54 and for a small portion of the length of the full diameter portion 53. The flat 56 gives the shaft 52 a D-shaped cross-sectional configuration at its right end as viewed in FIG. 2. An axially extending slot 58 extends diametrically through the opposite end of the shaft 52.

The spool 50 also includes a reel 60 comprising a sleeve 62 and a pair of spool locking ratchet wheels 64 and 66 fixed to opposite axial ends of the sleeve 62. Each spool locking ratchet wheel 64 and 66 has on its perimeter a plurality of circumferentially spaced ratchet teeth 74. The shaft 52 extends axially through the reel 60. The full diameter portion 53 of the shaft 52 extends through a circular opening 68 (FIG. 1) in the spool locking ratchet wheel 64. The reduced diameter D-shaped portion of the shaft 52 extends through a D-shaped opening 70 in the ratchet wheel 66. Thus, the reel 60 rotates with the shaft 52. Seat belt webbing 72 is wound about the sleeve 62.

The shaft 52 extends through the opening 20 in the frame side 16 and the opening 36 in the plate 30 and is supported for rotation by the boss 34 on the plate 30. The shaft 52 also extends through the opening 22 in the frame side 18 and the opening 44 in the attachment plate 40 and is supported for rotation by the boss 42 projecting from the attachment plate 40. Thus, the spool 50 is rotatable in a belt retraction direction 75 (FIG. 2) and a belt withdrawal direction 76 relative to the retractor frame.

A rewind coil spring 80 (FIG. 1) is located within a spring cover 82 fixed to the plate 30. The spring cover 82 has an axially extending wall portion 84 and a radially extending wall portion 86. A catch member 88 is fixed to the inside of the spring cover 82. A radially outer end portion 90 of the rewind spring 80 is attached to the catch member 88. A radially inner end portion 92 of the rewind spring 80 is received in the slot 58 in the shaft 52. The rewind spring 80 acts between the spring cover 82 and the shaft 52 and biases the spool 50 to rotate in the belt retraction direction 75.

A lock bar 100 includes a central portion 102 (best shown in FIG. 2) which extends between a pair of locking portions 104 and 106. A lock bar finger 108 extends axially from the locking portion 106. One end of the lock bar 100 is supported on the plastic projection 38 in the opening 24 in the frame side 16. The plastic projection 38 minimizes rattling noises caused by metal-to-metal contact between the lock bar 100 and the frame side 16. The other end of the lock bar 100 extends through the opening 26 in the frame side 18.

The lock bar finger 108 extends through the opening 46 in the attachment plate 40 and is received in a cam slot 110 in a lock bar actuator 112.

Figure 4:
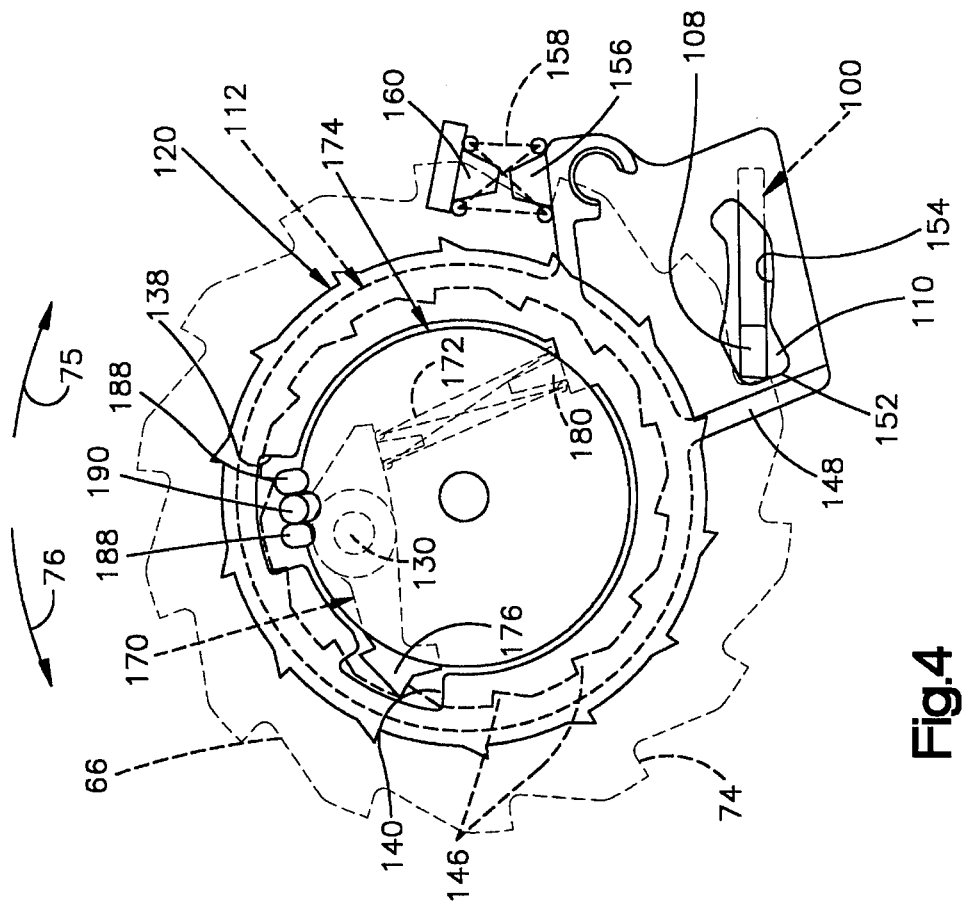

The actuator 112 has a plurality of internal teeth 146 on the interior of an outer wall 144. The lock bar actuator 112 is rotatable or pivotable between a first position (as viewed in FIGS. 3 and 5) and a second position (as viewed in FIGS. 4 and 6). A spring 158 biases the actuator 112 into the first position as viewed in FIGS. 3 and 5. The spring 158 acts between a spring support 156 on the lock bar actuator 112 and a spring support 160 fixed to the attachment plate 40. The lock bar actuator 112 includes a radially extending cam portion 148. The cam slot 110 extends through the cam portion 148 of the actuator 112. The cam slot 110 (FIG. 9) has a first end 150, a second end 152, and a camming surface 154 between the ends 150 and 152. As previously noted, the cam slot 110 receives the extending finger 108 of the lock bar 100. When the actuator 112 is rotated from the position shown in FIG. 3 to the position shown in FIG. 4, the camming surface 154 moves relative to the lock bar 100. The lock bar 100 is cammed by the camming surface 154 into a position where the locking portions 104 and 106 on the lock bar 100 engage ratchet teeth 74 on the spool locking ratchet wheels 64 and 66, respectively. Further rotation of the spool 50 in the belt withdrawal direction 76 is thereby blocked.

A ratchet 120 is disposed adjacent the actuator 112 and the attachment plate 40. The ratchet 120 has a radially extending disk portion 122 (see FIG. 1). A boss 124 projects axially from the disk portion 122 of the ratchet 120 in a direction toward the reel 60. A D-shaped opening 126 is formed in the boss 124 and receives the D-shaped end portion 54 of the shaft 52. Thus, the ratchet 120 rotates with the spool 50. The disk portion 122 also has a central projection 127 and a reduced diameter projection 128 which extend axially from the disk portion 122 in a direction away from the reel 60.

The ratchet disk portion 122 has a radially outer circular surface 123 which rotatably supports the lock bar actuator 112. The ratchet 120 also has a cylindrical wall 132 which extends axially from the disk portion 122 in a direction away from the reel 60. A circular wall 134 extends radially outwardly from the end of the wall 132. A plurality of ratchet teeth 136 are formed on the perimeter of the circular wall 134. The wall 132 and the wall 134 are partially cut away at two circumferentially spaced locations to form first and second openings 138 and 140 (FIGS. 2–4) extending radially through the ratchet 120 from the interior to the exterior of the ratchet.

Figure 3:
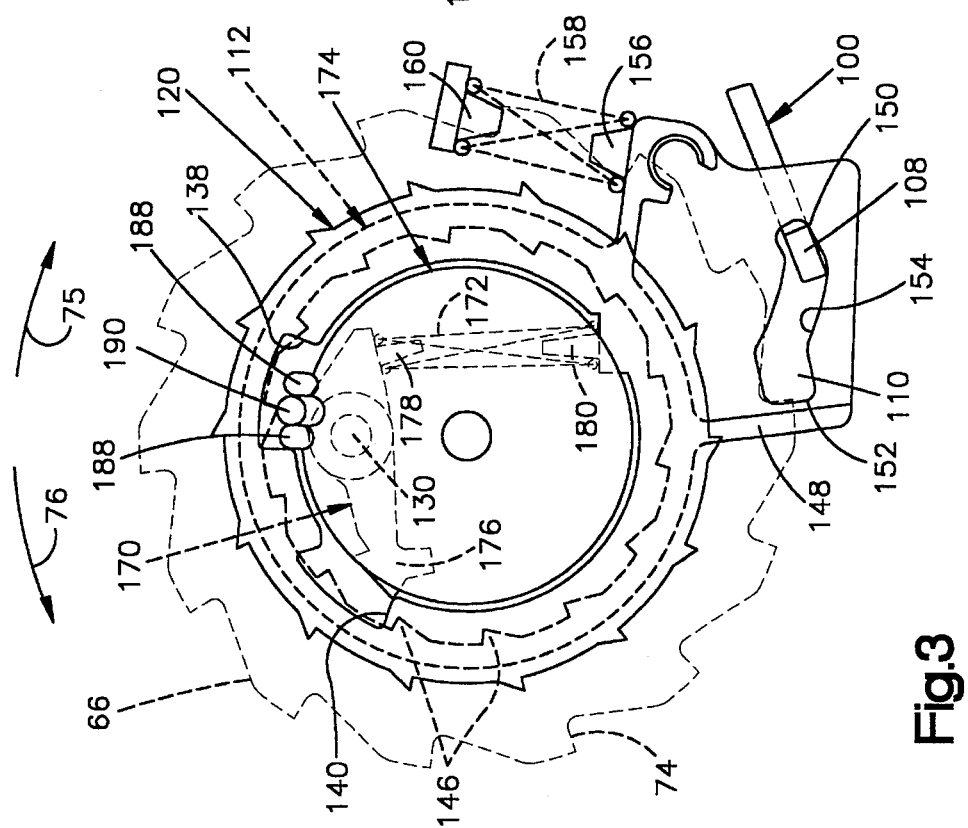
FIG. 3 is a schematic view of the retractor of FIG. 1 showing certain parts of the retractor.

A control pawl 170 (FIG. 3) is supported for pivotal movement on a pawl mounting hub 130 of the ratchet 120. The control pawl 170 has at one end a pawl tooth 176 and at its opposite end a spring support 178. The pawl tooth 176 is located adjacent the opening 140 in the ratchet 120, as shown in full lines in FIG. 7. A pawl spring 172 extends between the spring support 178 and a spring support 180 on the interior of the wall 132 of the ratchet 120. The pawl spring 172 biases the pawl 170 about the mounting hub 130 so that the pawl tooth 176 is normally positioned radially inwardly, that is, spaced from, the internal teeth 146 of the lock bar actuator 112, as shown in FIG. 3.

A flyweight 174 made of a relatively heavy material, such as zinc, is supported on the ratchet 120 for rotation relative to the ratchet 120. The flyweight 174 has a disk portion 182 and a hub 184 having a central opening 186 extending through the hub. The axial projection 128 of the ratchet 120 extends through the opening 186 in the flyweight 174. A pair of circumferentially spaced control pins 188 are positioned on the perimeter of the disk portion 182 of the flyweight 174 and project radially and axially into the opening 138 in the ratchet 120. The flyweight control pins 188 are spaced on either side of an axially extending pin 190 (FIGS. 2–4) on the control pawl 170. The flyweight 174 is thereby rotated by the pin 190 as the pawl 170 rotates with the ratchet 120.

The flyweight 174 is retained axially by a cover 190 (FIG. 1) fixed to the attachment plate 40 and the retractor frame 12. A central projection 192 on the inner surface 194 of the cover 190 engages the axial projection 128 of the ratchet 120. An annular projection 196 on the inner cover surface 194 of the cover 190 engages the flyweight hub 184 and holds the flyweight 174 axially against the projection 127 on the ratchet 120.

The lock bar actuator 112 is rotated to pivot the lock bar 100 into engagement with the spool locking ratchet wheels 64 and 66 in response to rapid withdrawal of seat belt webbing 72 from the spool 50. Specifically, the lock bar actuator 112 is rotated in response to withdrawal of seat belt webbing 72 from the spool 50 rapidly enough to cause the spool to experience an acceleration in the belt withdrawal direction 76 which is greater than a predetermined acceleration. The ratchet 120 and the pawl 170, which are rotationally fixed to the spool 50, also accelerate rapidly in the belt withdrawal direction 76. The flyweight 174 lags behind rotation of the spool 50, because it is relatively heavy, and rotates relative to the ratchet 120 and the pawl 170. The flyweight control pins 188 tend to retard rotation of the pin 190 on the control pawl 170. The control pawl 170 thus pivots on the mounting hub 130, against the biasing force of the spring 172. The pawl tooth 176 moves radially outwardly in the opening 140 in the ratchet 120 and engages one of the internal actuator teeth 146 (as shown in dotted lines in FIG. 7), thereby coupling the ratchet 120 and the actuator 112 for rotation. Thereafter, the pawl 170 transmits rotational force from the spool 50 to the actuator 112 to rotate the actuator 112 in the belt withdrawal direction 76, from the position shown in FIG. 3 to the position shown in FIG. 4. Thus, the lock bar 100 is cammed into engagement with the spool locking ratchet wheels 64 and 66, blocking rotation of the spool 50 in the belt withdrawal direction 76.

The retractor 10 also includes a vehicle deceleration sensing inertia weight 192, which may be, for example, a steel ball. The inertia weight 192 rests in a cavity 212 in a sensor housing 198. A sensor housing support plate 197 (FIG. 2) is fixed to the attachment plate 40. The support plate 197 has an upper channel 200 and a lower channel 202. A back plate 204 of the sensor housing 198 is received in the upper and lower channels 200 and 202 of the sensor housing support plate 197. The sensor housing 198 is thereby fixedly connected, through the attachment plate 40, to the retractor frame 12.

A sensor lever 194 is pivotally mounted on the sensor housing 198. Two pivot pins 214 on the sensor lever 194 are received in openings in the sensor housing 198. The sensor lever 194 rests upon the inertia weight 192. A projection 216 of the sensor lever 194 extends through an opening 210 in the sensor housing 198. The projection 216 can engage a portion 211 (FIG. 2) of the housing 198 to limit upward pivotal movement of the sensor lever 194. A portion 218 of the sensor lever 194 extends upwardly from the sensor lever 194 in a direction away from the inertia weight 192.

An L-shaped lock-up lever 196 (FIGS. 5 and 6) rests on the projecting portion 218 of the sensor lever 194. The lock up-lever 196 includes a first leg 240, a cylindrical portion 220 at one end of the first leg 240, and a second leg 248 extending at an-angle away from the other end of the first leg. A key 224 (FIGS. 7 and 8) extends radially outward from one end of the cylindrical portion 220 of the lock-up lever 196.

A cylindrical chamber 222 is formed in the cam portion 148. The chamber 222 is open at one end and is closed at its other end by a back wall 231 (FIGS. 9 and 10) of the lock bar actuator 112. A slot 242 defined by surfaces 244 and 246 of the cam portion 148 extends along the length of the chamber 222. The axial length of the chamber 222 is substantially the same as the axial length of the cylindrical portion 220 of the lock-up lever 196.

A keyway 226 (FIGS. 9 and 10) extends radially outward from one end of the cylindrical chamber 222. The keyway 226 is formed by forming a hole 234, that intersects the chamber 222, through the back wall 231 and by forming an opening 250 (FIGS. 10 and 11) in the surface 244, which opening communicates with the chamber 222.

The cylindrical portion 220 of the lock-up lever 196 pivotally mounts the lock-up lever on the cam portion 148 of the lock bar actuator 112. The cylindrical portion 220 of the lock-up lever 196 is received in the chamber 222. The lock-up lever is pivotal in the chamber 222 about the axis of the cylindrical portion 220.

The key 224 is received in the keyway 226 and moves in the keyway 226 upon pivoting of the lock-up lever 196. A radially extending pivotal stop surface 228 (FIG. 10) defining the keyway 226 engages the key 224 to limit clockwise pivoting of the lever 196, as viewed in FIGS. 5 and 10. The key 224 is also engageable with an axial stop surface 227 (FIG. 11) defining the keyway. Engagement of the key 224 with the axial stop surface 227 blocks axial movement of the key out of the keyway 226 and axial movement of the cylindrical portion 220 out of the chamber 222.

A spherical portion 230 (FIGS. 7 and 11) projects from an axial end surface of the cylindrical portion 220. The spherical portion 230 engages a surface 229 of the back wall 231 of the lock bar actuator 112 defining the end of the cylindrical chamber 222. A semi-cylindrical surface 232 (FIG. 11) of the lever 196 extends from the key 224 to the cylindrical portion 220. The semi-cylindrical surface 232 defines a recess adjacent the cylindrical portion and facing surface 227. The spherical portion 230, the semi-cylindrical surface 232, and the opening 234 in the back wall 231 minimize the amount of surface area of the lever 196 which contacts the lock bar actuator 112. Minimizing the contact surface area allows for movement of the lever 196 relative to the actuator 112 with a minimum of friction.

The first leg 240 of the lock-up lever 196 extends from the cylindrical portion 220 (FIGS. 5 and 6) in the chamber 222 through the slot 242 (FIG. 9). The second leg 248 of the lock-up lever 196 extends at an angle upward from the first leg 240 in a direction toward the ratchet 120. The keyway 226 (FIGS. 9 and 10) extends from the surface 228 to the opening 250 in the surface 244.

To mount the lock-up lever 196 on the actuator 112, the cylindrical portion 220 of the lock-up lever 196 is moved axially into the chamber 222 from its open end with the key 224 and the first leg 240 extending through the slot 242. When the spherical portion 230 engages the back wall 231, the lever 196 is rotated in a clockwise direction, as viewed in FIG. 10, to insert the key 224 through opening 250 into the keyway 226. The sensor lever 194 is then mounted on the sensor housing 198. The lock-up lever 196 rests on the sensor lever 194 with the key 224 in the keyway 226.

When the vehicle in which the retractor 10 is mounted is not decelerating above a predetermined deceleration, the inertial weight 192 rests in the cavity 212 (FIG. 5) in the bottom of the sensor housing 198. When the inertial weight 192 is in this position, the second leg 248 of the lock-up lever 196 is spaced from the exterior teeth 136 on the ratchet 120. Upon deceleration of the vehicle greater than a predetermined deceleration, the inertial weight 192 moves relative to the sensor housing 198. Movement of the inertial weight 192 pivots the sensor lever 194 upwardly from the position shown in FIG. 5 to the position shown in FIG. 6. The projecting portion 218 of the sensor lever 194 presses the lock-up lever 196 upward. The lock-up lever 196 pivots, and the second leg 248 of the lock-up lever 196 moves into engagement with the exterior of the ratchet 120. Rotation of the spool 50 and the ratchet 120 in the belt withdrawal direction 76 causes the next available ratchet tooth 136 to engage the second leg 248 of the lock-up lever 196. Thereafter, the lock-up lever 196 transmits rotational force from the ratchet 120 to the actuator 112 to rotate the actuator 112 from the position shown in FIG. 5 to the position shown in FIG. 6. Thus, the lock bar 100 is cammed into engagement with the spool locking ratchet wheels 64 and 66, blocking rotation of the spool 50 in the belt withdrawal direction.

From the above description of the inventions those skilled in the art will perceive improvements, changes and modifications. Such improvements, changes and modifications within the skill of the art are intended to be covered by the appended claims.

Having described the invention, the following is claimed:

1. A vehicle seat belt retractor comprising:

a spool on which seat belt webbing is wound and which is rotatable in belt withdrawal and belt retraction directions;

a lever for use in preventing rotation of said spool in the belt withdrawal direction and having a cylindrical portion and a key extending radially outward from said cylindrical portion said lever including a surface defining a recess in said lever facing said axial stop surface; and support means for supporting said lever for pivotal movement relative to said support means including first surface means for defining a cylindrical chamber for receiving said cylindrical portion of said lever and second surface means for defining a keyway extending radially outward from said cylindrical chamber for receiving said key of said lever, said second surface means including an axial stop surface engageable by said key of said lever to block axial movement of said cylindrical portion relative to said cylindrical chamber.

2. A vehicle seat belt retractor comprising:

a spool on which seat belt webbing is wound and which is rotatable in belt withdrawal and belt retraction directions;

a lever for use in preventing rotation of said spool in the belt withdrawal direction and having a cylindrical portion and a key extending radially outward from said cylindrical portion; and support means for supporting said lever for pivotal movement relative to said support means including first surface means for defining a cylindrical chamber for receiving said cylindrical portion of said lever and second surface means for defining a keyway extending radially outward from said cylindrical chamber for receiving said key of said lever, said second surface means including an axial stop surface engageable by said key of said lever to block axial movement of said cylindrical portion relative to said cylindrical chamber;

said cylindrical portion of said lever includes a spherical portion extending from an axial end surface of said cylindrical portion, said spherical portion being engageable with said first surface means defining said cylindrical chamber.

3. A vehicle seat belt retractor comprising:

a spool on which seat belt webbing is wound and which is rotatable in belt withdrawal and belt retraction directions;

a lever for use in preventing rotation of said spool in the belt withdrawal direction and having a cylindrical portion and a key extending radially outward from said cylindrical portion, said key of said lever extending from an axial end portion of said cylindrical portion; and support means for supporting said lever for pivotal movement relative to said support means including first surface means for defining a cylindrical chamber for receiving said cylindrical portion of said lever and second surface means for defining a keyway extending radially outward from said cylindrical chamber for receiving said key of said lever, said second surface means including an axial stop surface engageable by said key of said lever to block axial movement of said cylindrical portion relative to said cylindrical chamber.

4. A vehicle seat belt retractor comprising:

a spool on which seat belt webbing is wound and which is rotatable in belt withdrawal and belt retraction directions;

a lever for use in preventing rotation of said spool in the belt withdrawal direction and having a cylindrical portion and a key extending radially outward from said cylindrical portion; and support means for supporting said lever for pivotal movement relative to said support means including first surface means for defining a cylindrical chamber for receiving said cylindrical portion of said lever and second surface means for defining a keyway extending radially outward from said cylindrical chamber for receiving said key of said lever, said second surface means including an axial stop surface engageable by said key of said lever to block axial movement of said cylindrical portion relative to said cylindrical chamber;

said second surface means including a pivotal stop surface engageable by said key of said lever to limit the pivotal movement of said lever.

5. A vehicle seat belt retractor comprising:

a spool on which seat belt webbing is wound and which is rotatable in belt withdrawal and belt retraction directions;

a lever for use in preventing rotation of said spool in the belt withdrawal direction and having a cylindrical portion and a key extending radially outward from said cylindrical portion;

support means for supporting said lever for pivotal movement relative to said support means including first surface means for defining a cylindrical chamber for receiving said cylindrical portion of said lever and second surface means for defining a keyway extending radially outward from said cylindrical chamber for receiving said key of said lever, said second surface means including an axial stop surface engageable by said key of said lever to block axial movement of said cylindrical portion relative to said cylindrical chamber;

a ratchet wheel connected to said spool; and a pawl engageable with said ratchet wheel to prevent rotation of said spool in the belt withdrawal direction, said support means for supporting said lever being an actuator means for moving said pawl into engagement with said ratchet wheel.

6. A vehicle seat belt retractor as set forth in claim 5 wherein said lever pivots relative to said support means in response to deceleration of the vehicle greater than a predetermined deceleration to cause said pawl to engage said ratchet wheel connected to said spool.

7. A vehicle seat belt retractor as set forth in claim 6 further including means for moving said pawl into engagement with said ratchet wheel in response to acceleration of said spool in the belt withdrawal direction greater than a predetermined acceleration.

8. A vehicle seat belt retractor comprising:

a spool on which seat belt webbing is wound and which is rotatable in belt withdrawal and belt retraction directions;

a lever for use in preventing rotation of said spool in the belt withdrawal direction and having a cylindrical portion and a key extending radially outward from said cylindrical portion; and support means for supporting said lever for pivotal movement relative to said support means including first surface means for defining a cylindrical chamber for receiving said cylindrical portion of said lever and second surface means for defining a keyway extending radially outward from said cylindrical chamber for receiving said key of said lever, said second surface means including an axial stop surface engageable by said key of said lever to block axial movement of said cylindrical portion relative to said cylindrical chamber;

said second surface means including a pivotal stop surface engageable by said key of said lever to limit the pivotal movement of said lever;

said lever further including a leg extending radially outward from said cylindrical portion, said first surface means defining said cylindrical chamber including surfaces defining a slot through which said leg extends, an opening being formed in said surfaces defining said slot through which said key is inserted into said keyway, said keyway extending from said pivotal stop surface limiting pivotal movement of said lever to said opening.

9. A vehicle seat belt retractor as set forth in claim 8 further including means for preventing said key of said lever from moving out of said keyway through said opening.

10. A vehicle seat belt retractor as set forth in claim 9 wherein said means for preventing said key from moving out of said keyway includes a sensor for pivoting said lever in response to vehicle deceleration greater than a predetermined deceleration.

* * * * *